United States Patent
Kritayakirana et al.

(10) Patent No.: US 6,760,126 B1
(45) Date of Patent: Jul. 6, 2004

(54) ADAPTIVE HALFTONING METHOD AND APPARATUS

(75) Inventors: Kong Kritayakirana, Sunnyvale, CA (US); Daniel R. Tretter, Palo Alto, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 954 days.

(21) Appl. No.: 09/597,862

(22) Filed: Jun. 20, 2000

(51) Int. Cl.[7] .......................... H04N 1/405; H04N 1/409
(52) U.S. Cl. ...................... 358/2.1; 358/3.15; 358/3.14
(58) Field of Search .......................... 358/1.9, 2.1, 3.03, 358/3.05, 3.06, 3.13, 3.14, 3.15, 3.24, 534, 535, 462; 382/270, 237, 252

(56) References Cited

U.S. PATENT DOCUMENTS

| | | | | |
|---|---|---|---|---|
| 5,153,925 | A | * 10/1992 | Tanioka et al. | 382/252 |
| 5,926,570 | A | * 7/1999 | Smitt | 382/237 |
| 5,970,178 | A | 10/1999 | Lin | 382/251 |
| 6,137,907 | A | * 10/2000 | Clark et al. | 382/176 |
| 6,185,336 | B1 | * 2/2001 | Clark et al. | 358/1.9 |
| 6,229,923 | B1 | * 5/2001 | Williams et al. | 382/173 |
| 6,356,362 | B1 | * 3/2002 | Ostromoukhov | 358/1.9 |
| 6,549,658 | B1 | * 4/2003 | Schweid et al. | 382/173 |

OTHER PUBLICATIONS

Andreas E. Savakis, "Adaptive Document Image Thresholding Using Foreground And Background Clustering", ICIP98 Proceedings, IEEE Comput Soc (1998) vol. 3 of 3, pp. 785–789.*

* cited by examiner

*Primary Examiner*—Scott Rogers

(57) ABSTRACT

Methods and apparatus for adaptive halftoning for accommodating a mix of high and low visual activity are provided. Accommodations for white gap reduction and variable darkening are provided for print engine imperfections. A method includes the steps of thresholding a selected pixel of a source image to generate a first dithered output signal, L. The selected pixel is also thresholded to generate a second dithered output signal, S. A weighted combination of the first and second dithered output signals is generated in accordance with at least one of an edge activity indicator parameter and a mix suppression parameter. The parameters are calculated from pixel values within a contiguous region of the source image including the selected pixel. The first and second dithered output signals correspond to large and small threshold matrices in one embodiment. The second dithered output signal may be boosted using a variable darkening parameter, $\gamma$, to accommodate isolated dot gain problems before being combined. The edge activity indicator is indicative of the frequency of change within the selected region. The edge activity index favors the large array for low activity and the small array for high activity. The mix suppression parameter is used to suppress the mixture of the small dither matrix on the light side of an edge as well as to preserve the sharpness of anti-aliased edges. An edge indicator is used to compensate for more favorable dot development along edges between a darker tone region and an almost white region.

20 Claims, 10 Drawing Sheets

PULSE WIDTH HALFTONE TABLE

| | | CELL INDEX | | | | |
|---|---|---|---|---|---|---|
| | 1 | 2 | 3 | ••• | N-1 | N |
| 255 | 0 | 0 | 0 | ••• | 0 | 0 |
| 254 | 127 | 0 | 0 | ••• | 0 | 0 |
| 253 | 255 | 113 | 63 | ••• | 0 | 0 |
| ⋮ | ⋮ | ⋮ | ⋮ | ⋱ | ⋮ | ⋮ |
| 1 | 255 | 255 | 255 | ••• | 255 | 121 |
| 0 | 255 | 255 | 255 | ••• | 255 | 255 |

900

TONE LEVEL

910

PULSE WIDTH 930

ADAPTIVE HALFTONING METHOD AND APPARATUS

FIELD OF THE INVENTION

This invention relates to the field of printing. In particular, this invention is drawn to digital halftoning of continuous tone images.

BACKGROUND OF THE INVENTION

Rendering of continuous tone images such as photographs typically requires a halftoning process to convert the continuous tones into discrete tone levels that can be realized through a printing device such as a laser printer. Sophisticated halftoning processes are designed to create a halftoned image that is reproducible on the discrete rendering device while minimizing visually perceptible differences between the original image and the rendered image.

One halftoning technique used in laser printer applications is referred to as clustered dot dithering. A threshold or halftone matrix is used to halftone the image. Generally, a halftone value is computed for each selected pixel as a function of the tone value of the selected pixel and the value at the corresponding location in the halftone matrix. The pattern and size of the final halftone dot structures are determined by the entries and size of the halftone matrix.

Although large array sizes can be designed as high spatial frequency screens by selecting the appropriate values for the matrix elements, the larger matrix sizes are typically used to realize low spatial frequency screens. Low spatial frequency screens are efficient and accurate for large areas of substantially constant or slowly varying tone, but the low spatial frequency screens tend to smooth or blur fine detail such as lines and edges. The low spatial frequency screens tend to reproduce smooth tone regions well at the expense of errors or loss of detail in the busy areas of the reproduced image.

The use of high spatial frequency screens can bring out detail in perceptually busy areas of the image such that detail is substantially maintained in the halftoned image. The high spatial frequency screens, however, tend to result in halftoned images that have perceptual artifacts when compared with the original image in the areas of substantially constant or slowly varying tone. The use of high spatial frequency screens tends to result in greater detail in busy areas at the expense of introducing errors in the smooth areas of the image such as area fill and non-edge regions of a photograph.

Thus one disadvantage with conventional digital halftoning processes is that choosing exclusively between a threshold matrix having a high spatial frequency and one with a low spatial frequency necessarily trades detail for tonal quality.

SUMMARY OF THE INVENTION

In view of limitations of known systems and methods, methods and apparatus for adaptive halftoning to accommodate images having a mix of high and low visual activity are provided. Accommodations for white gap reduction and variable darkening are provided for print engine imperfections.

In one embodiment, a halftoning method includes the step of thresholding a selected pixel of a source image to generate a first dithered output signal, L. The selected pixel is also thresholded to generate a second dithered output signal, S. A weighted combination of the first and second dithered output signals is generated in accordance with at least one of an edge activity indicator parameter (EAI) and a mix suppression parameter ($\eta$).

The edge activity indicator is indicative of the frequency of change within a selected region containing the selected pixel. The combination step weights the first dithered output signal (resulting from thresholding using a low spatial frequency) more favorably when the EAI indicates relatively little changes indicative of larger areas of non-varying or slowly varying tonal values in the selected region. The combination step weights the second dithered output signal (resulting from thresholding using a high spatial frequency) more favorably when the EAI indicates greater amounts of change indicative of edges and fine lines within the selected region of the source image.

The mix suppression parameter is used to suppress the weighting of the second dithered output signal relative to the first dithered output signal on the light side of an edge as well as to preserve the sharpness of anti-aliased edges.

The second dithered output signal (i.e., S, resulting from thresholding at a higher spatial frequency than that used for the first dithered output signal) may be boosted to the value V using a variable darkening parameter, $\gamma$, to accommodate isolated dot gain problems before being combined with the first dithered output signal, L. Alternatively, variable darkening can be eliminated by setting 65 to 0.

An edge indicator (EI) may be used to compensate for more favorable dot development along edges between a darker tone region and an almost white region. The EI parameter is particularly suitable for handling white gap reduction due to printer anomalies.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 9 illustrates a two dimensional pulse width halftone lookup table.

DETAILED DESCRIPTION

Continuous tone images refer to images that have a virtually unlimited range of color or shades of gray.

Photographs, for example, are continuous tone images. Digital hardware, however, is limited to expressing color or tone within a finite number of bits or even a single bit (i.e., "on" or "off"). Gray scaling and dithering are two processes used to approximate continuous tone images within the limitations of digital hardware.

Gray scaling is the process of creating the illusion of continuous tone through the use of patterns of "dots" where each dot can have a different shade of gray. Dots can be any variety of shapes. Circular or elliptical dots are common in printing applications. Rectangular or square dots (e.g., pixels) are common geometries in display technologies such as computer monitors. Although the number of gray scales is necessarily finite, there are typically enough shades (e.g., 256 for an 8 bit pixel) so that the difference between one shade and the next is imperceptible to the human eye.

Dithering is a process of creating the illusion of new colors and shades by varying the density, pattern, and the size of dots. Individual dots do not have variable levels of shading. Thus for black and white imagery different shades of gray are simulated by varying the density and pattern of black and white dots. In printing, dithering is called halftoning and the shades of gray realized through particular patterns of black and white dots are called halftones.

In conventional printing, halftones are created by photographing an image through a screen. The screen frequency determines the number of dots used to make each spot of gray. In digital image processing, screening parameters include screen frequency, recorder resolution and halftone dots, and dot size and shape. In contrast with traditional screening, dithering or halftoning of an image for digital image processing is usually accomplished through the use of a threshold array in the spatial domain to achieve a specific texture in the final binary image.

One technique for halftoning computes a halftone array or screen based on the "activity" in the area being halftoned. To render a page with a mixture of text, line art, area fill, and photograph, for example, the "busy areas" such as line art and edges in a photograph are rendered with a higher resolution screen than the "non-busy areas". Smooth areas such as area fill and non-edge regions in a photograph may be better rendered using a lower resolution screen on some digital imaging devices.

Figure 1:
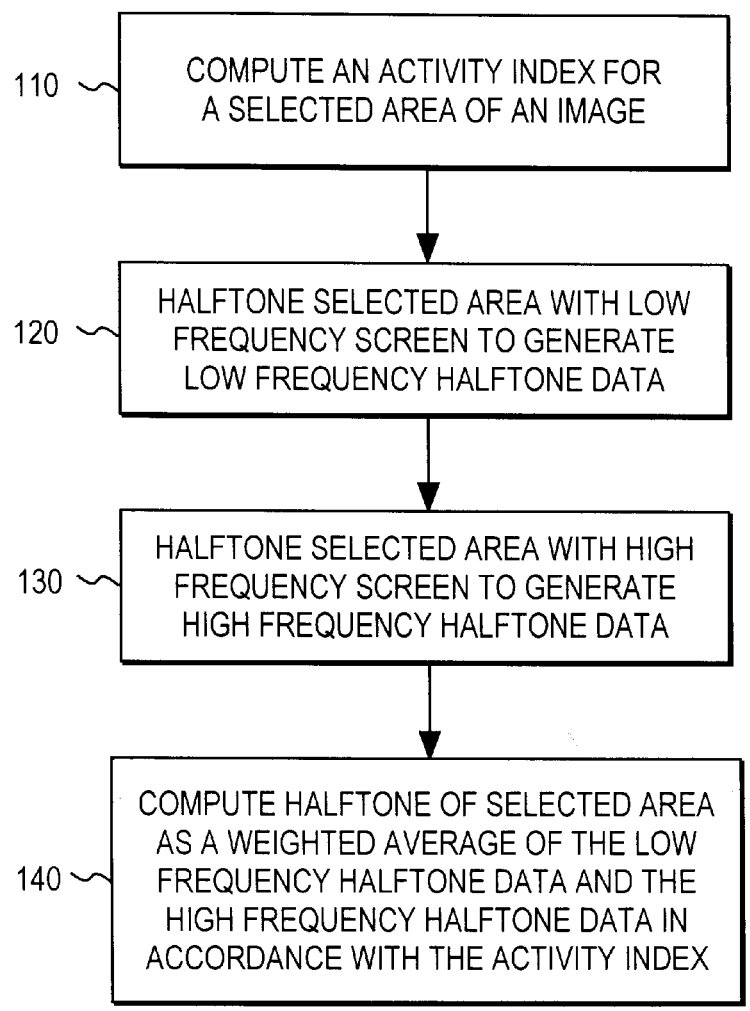
FIG. 1 illustrates an adaptive halftoning method.

FIG. 1 illustrates one embodiment of an adaptive halftoning method based on an activity index of the area being halftoned. An activity index is computed for a selected area of the image in step 110. A low frequency halftone screen is applied to the selected area to generate low frequency halftone data in step 120. A high frequency halftone screen is applied to the selected area to generate high frequency halftone data in step 130. The halftone for the selected area is computed as a weighted average of the low and high frequency halftone data in step 140 based on the activity index.

Figure 2:
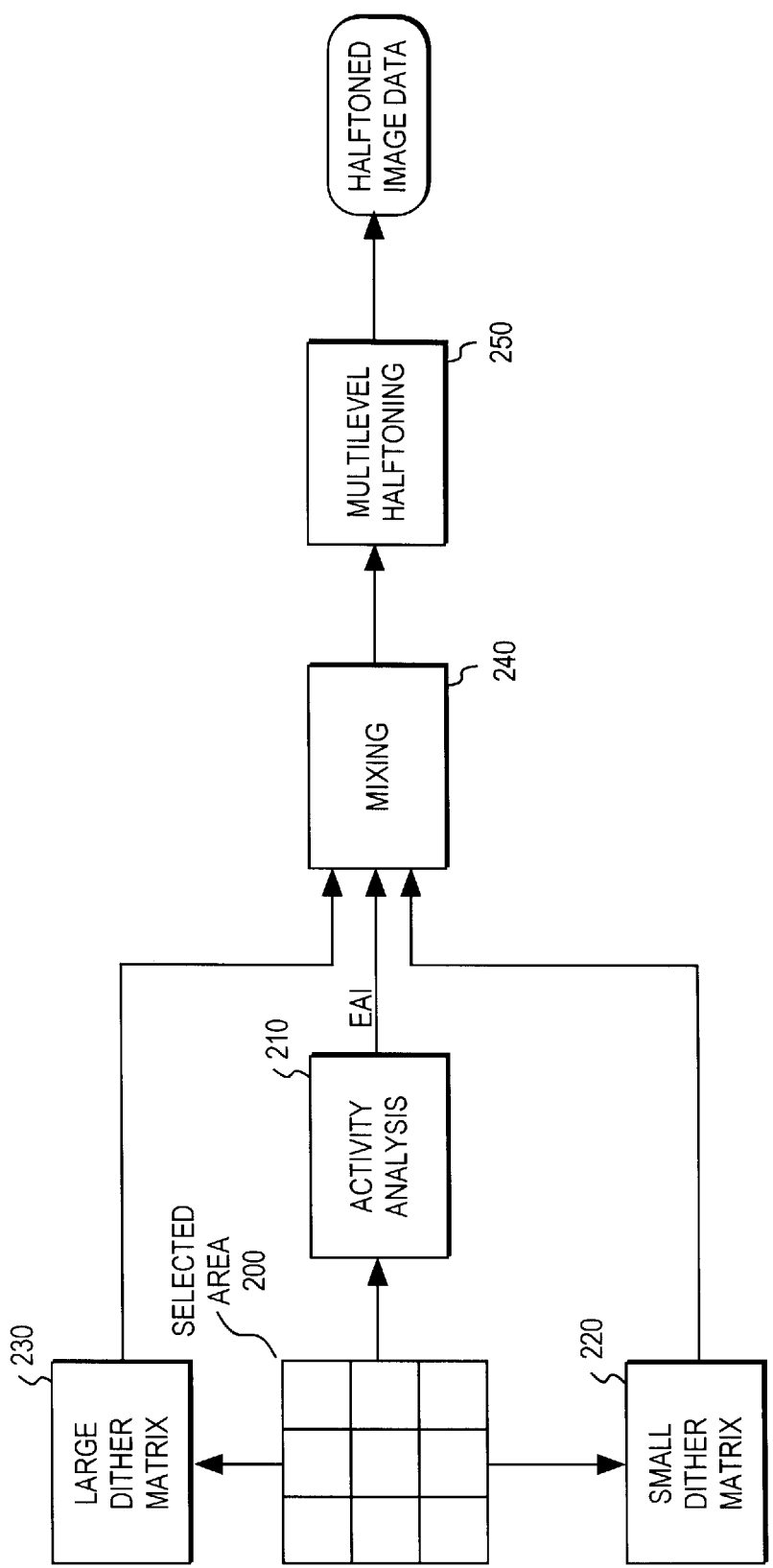
FIG. 2 illustrates components of an adaptive halftoning system.

The control flow for the process of FIG. 1 is illustrated in FIG. 2. An activity analysis 210 is performed on the selected area 200 of a source image to generate an activity index comprising one or more parameters. In one embodiment the source image is a grayscale monochrome image. Alternatively, the source image may be a grayscale color image. A large dither matrix 230 corresponding to the low spatial frequency screen is applied to the selected area 200 of the image. Similarly, a small dither matrix 220 corresponding to the high spatial frequency screen is applied to the selected area 200 of the image. Application of the low frequency dither matrix and the high frequency dither matrix can produce halftone image data that retains a large number of gray levels of the source image, but imparts dot structures determined by the halftone screens or arrays. In one embodiment, the low frequency screen (i.e., the large dither matrix) is a clustered-dot screen.

A mixing block 240 computes a weighted average of the results from the small and large matrix dithering in accordance with the activity index provided by the activity analysis 210. If the activity index is high, then the weighting is biased toward the high frequency screen (i.e., the results of the small dither matrix). If the activity index is low, then the weighting is biased toward the low frequency screen (i.e., the large dither matrix). If desired, a multilevel halftoning process 250 can be applied to reduce the number of grayscale levels to be sent to the rendering device.

Additional adjustments may be necessary for color source images and color rendering devices such as a color laser printer. Electrophotography (EP) laser printers operate by creating an image to be rendered on an electrically charged transfer device such as a rotating drum. The image is typically created using a laser source to expose a photoconductive medium (e.g., the drum) on a pixel by pixel basis by pulsing the laser. Some laser printers permit only on/off control of the pixel and thus the laser pulses are fixed width. Other laser printers permit varying the pulse width of the laser source and thus have partial pixel control. Toner is applied to the photoconductive transfer device and adheres through electrostatic attraction in the form of the image. The transfer device transfers the toner to the final medium such as paper. Depending upon the specifics of the printer engine, the process may be susceptible to creating visual artifacts from anti-aliased edges in the original image, white gaps from misregistration for color laser printers, receding edges, and other anomalies.

Figure 3:
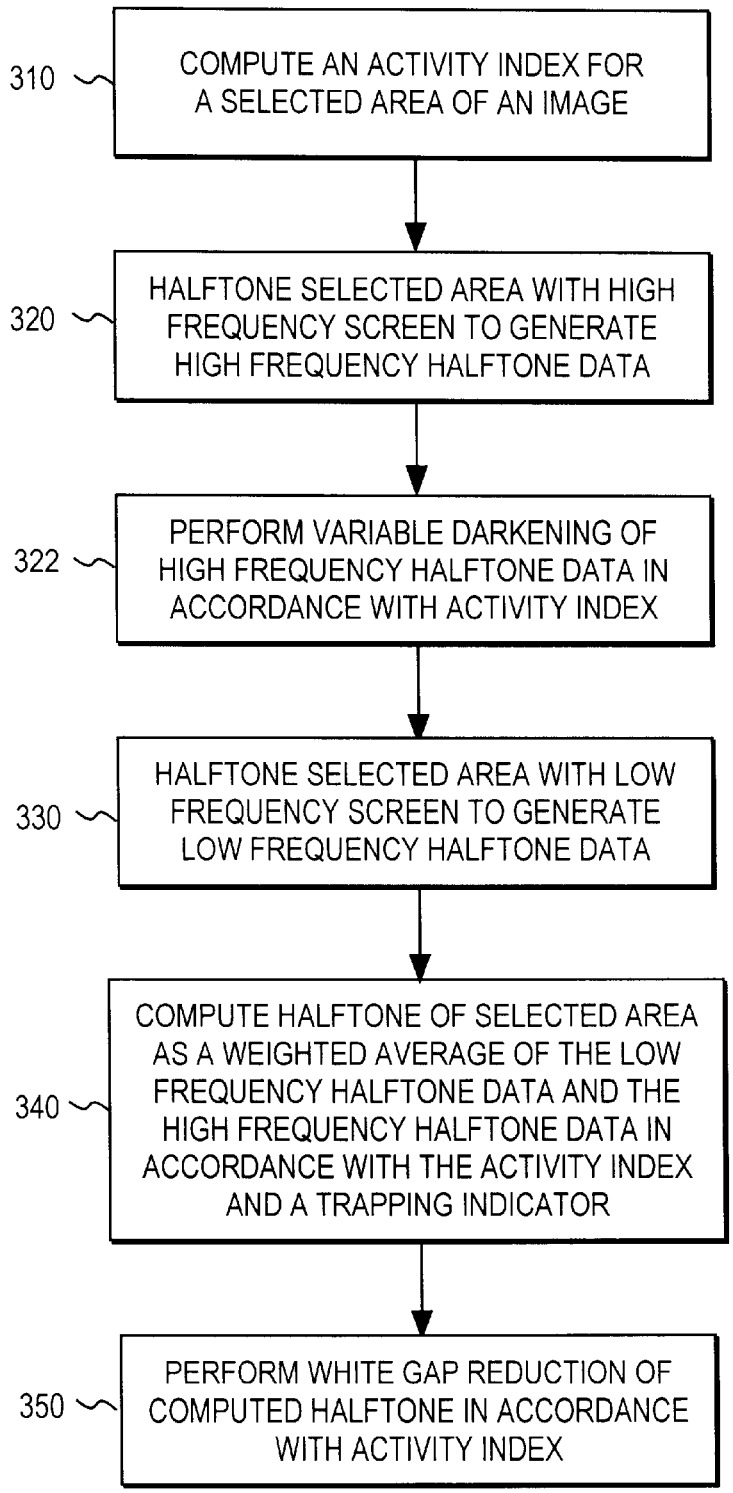
FIG. 3 illustrates an alternative embodiment of an adaptive halftoning method.

An improved adaptive halftoning process illustrated in FIG. 3 is particularly suited for color halftoning in the cyan-magenta-yellow-black (CMYK) color space, although other color space implementations may be similarly accommodated. In CMYK color space, the tone value 0 corresponds to white and 255 corresponds to full saturation in 8 bit per color plane per pixel representation. The tone values may be normalized into a [0, 1] range where 0 corresponds to white and 1 corresponds to full saturation.

The adaptive halftoning process of FIG. 3 computes an activity index for a selected area of the image in step 310. The activity index of FIG. 3 includes additional parameters used to weight the results of the large and small matrix dithering. In particular, an edge activity index (EAI) parameter is provided to better describe the orientation and strength of edges and lines. A mixing suppression parameter ($\eta$) is provided to suppress the weighting of the lower frequency dithering matrix on the light side of an edge as well as to preserve the sharpness of anti-aliased edges.

Other parameters may be provided to handle idiosyncrasies particular to specific printer engines. For example, some printers may be particularly susceptible to receding edge complications. A receding edge is typically caused by a complication in the exposure process or in the toner transfer process that results in either no toner or less toner than desired being deposited. An edge dot compensation parameter (gamma or $\gamma$) is provided to compensate for receding edges.

Some printers produce white gaps along edges between a dark region and an almost white region. In these printers, the dark edge will recede slightly, leaving a white gap along the edge. This gap can be eliminated by printing a darker tone level along the edge than what would otherwise be necessary. In one embodiment, an edge indicator (EI) parameter is used to detect the presence of edges for enabling white gap reduction that may be necessary for some printer engines. Other parameters may be provided throughout the process to tailor the halftoning process to the idiosyncrasies of a particular printer engine.

The selected area of the source image is halftoned with a high frequency screen to generate high frequency halftone data in step 320. Variable darkening may be performed if desired in step 322. Variable darkening compensates for EP characteristics such as neighboring dot interactions. The variable darkening is performed in accordance with the γ parameter of the activity index. The selected area is also halftoned with a low frequency screen to generate low frequency halftone data in step 330.

A halftone of the selected area is computed as a weighted average of the low and high frequency halftone data in accordance with the activity index and a trapping indicator in step 340. Trapping may be necessary to accommodate the improper alignment of the different color planes by some devices which is referred to as misregistration. Misregistration can lead to unprinted areas along edges between different color regions. The process of reducing these areas by underprinting the lighter color along edges to cause an overlap between the color planes is referred to as trapping.

The trapping indicator is used to accommodate under printing a darker color with the adjacent lighter color. In one embodiment, the trapping indicator includes a trapping flag and the value of the adjacent lighter color. The trapping flag indicates whether or not trapping is enabled. If trapping is not necessary (e.g., for non-color laser printers), then trapping can be disabled so that computation of the weighted average is independent of the trapping indicator. A white gap reduction step 350 may also be performed to handle white gaps that may otherwise be introduced as a result of laser printer toner deposition characteristics.

Figure 4:
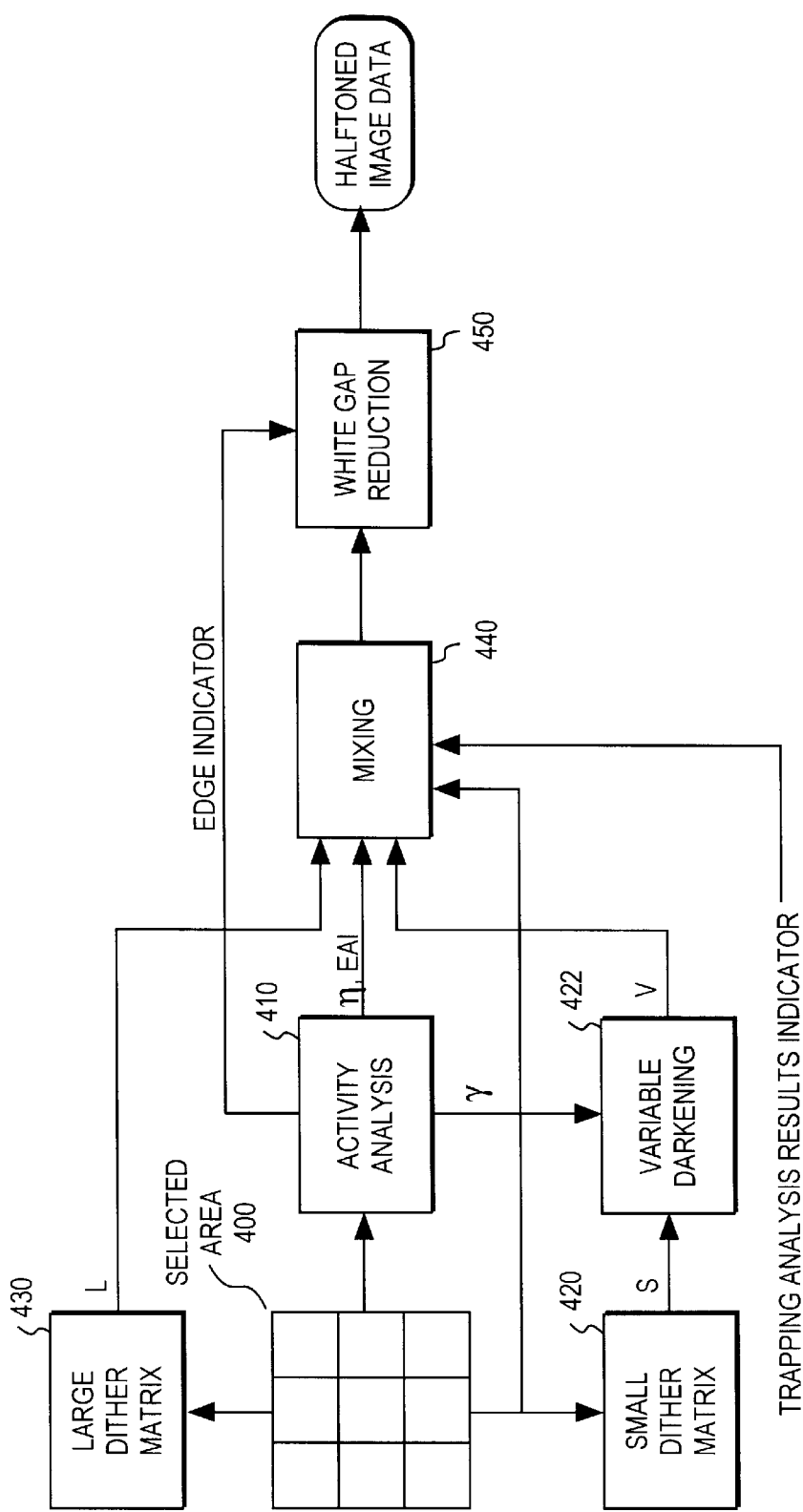
FIG. 4 illustrates components of an adaptive halftoning system for performing the method of FIG. 3.

FIG. 4 illustrates a control flow for the process of FIG. 3. An activity analysis 410 is performed on the selected area 400 of an image to generate an activity index comprising one or more parameters. A large dither matrix (corresponding to the low spatial frequency screen) and a small dither matrix (corresponding to the high spatial frequency screen) are applied to the selected area of the image in blocks 430 and 420, respectively. The output (S) of the small dither matrix block is provided to the variable darkening block 422, if variable darkening is desired. Any variable darkening is performed in accordance with a gamma (γ) parameter component of the activity index provided by activity analysis block 410.

The output (V) of the variable darkening block 422 and the output (L) of the large dither matrix block 430 are provided to mixing block 440. Mixing block 440 computes a weighted average in accordance with the edge activity index parameter, the mix suppression parameter (η) provided by the activity analysis block 410 and a trapping indicator.

Figure 5:
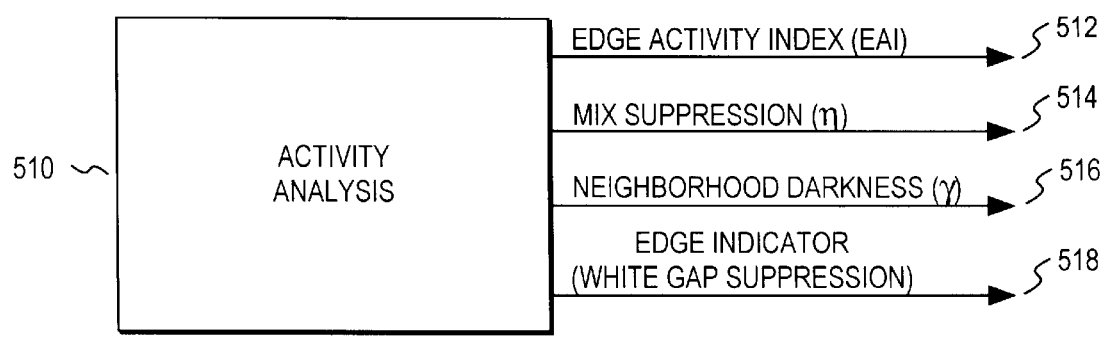
FIG. 5 illustrates parameters of an activity index.

FIG. 5 illustrates the parameters that may be produced by the activity analysis block 410 of FIG. 4. In particular, activity analysis block 510 analyzes the selected area of the source image to produce a plurality of parameters to be used in color halftoning. The parameters include the edge activity index (EAI) 512 and the mix suppression parameter (η) 514 for the mixing block. The neighborhood darkness adjustment parameter (γ) 516 is provided for the variable darkening block 422 of FIG. 4. In addition, the edge indicator (EI) parameter 518 is provided for controlling the white gap reduction response.

In one embodiment, the selected area of the source image is a 3×3 window of pixels. Continuous tone values are approximated using an 8-bit unsigned integer for each pixel. Thus each pixel can have a value in a range of 0–255. For purposes of the following calculations, the 3×3 window of pixels are associated with identifiers $p_1$–$p_9$ as follows:

$$p_1\ p_2\ p_3$$

$$p_4\ p_5\ p_6$$

$$p_7\ p_8\ p_9$$

Horizontal averages $h_1$, $h_2$, $h_3$ are calculated as follows:

$$h_1 = p_1 + p_2 + p_3$$

$$h_2 = p_4 + p_5 + p_6$$

$$h_3 = p_7 + p_8 + p_9$$

Vertical averages $v_1$, $v_2$, and $v_3$ are calculated as follows:

$$v_1 = p_1 + p_4 + p_7$$

$$v_2 = p_2 + p_5 + p_8$$

$$v_3 = p_3 + p_6 + p_9$$

Diagonal averages $d_1$–$d_3$ and $D_1$–$D_3$ representing averages at ±45° angles are calculated as follows:

$$d_1 = p_1 + p_2 + p_4$$

$$d_2 = p_3 + p_5 + p_7$$

$$d_3 = p_6 + p_8 + p_9$$

$$D_1 = p_2 + p_3 + p_6$$

$$D_2 = p_1 + p_5 + p_9$$

$$D_3 = p_4 + p_7 + p_8$$

The magnitudes and sign values for the edges can be determined as follows:

$$\text{sign}_0 = sgn(h_2 - h_1);\ \text{mag}_0 = |h_2 - h_1|$$

$$\text{sign}_1 = sgn(h_2 - h_3);\ \text{mag}_1 = |h_2 - h_3|$$

$$\text{sign}_2 = sgn(v_2 - v_1);\ \text{mag}_2 = |v_2 - v_1|$$

$$\text{sign}_3 = sgn(v_2 - v_3);\ \text{mag}_3 = |v_2 - v_3|$$

$$\text{sign}_4 = sgn(d_2 - d_1);\ \text{mag}_4 = |d_2 - d_1|$$

$$\text{sign}_5 = sgn(d_2 - d_3);\ \text{mag}_5 = |d_2 - d_3|$$

$$\text{sign}_6 = sgn(D_2 - D_1);\ \text{mag}_6 = |D_2 - D_1|$$

$$\text{sign}_7 = sgn(D_2 - D_3)\ \text{mag}_7 = |D_2 - D_3|$$

where |x| denotes the absolute value of x and signum (sgn(x)) is defined as follows:

$$sgn(x)\begin{cases} 1, & \text{if } x > 0 \\ 0, & \text{otherwise} \end{cases}$$

EDGE ACTIVITY INDEX, EAI

In one embodiment, the edge activity index, (EAI) is defined as one fourth of the sum of the values corresponding to the two largest magnitudes $mag_0$–$mag_7$. Thus, for example, if $mag_2$ and $mag_3$ are the two largest values (i.e., greater than or equal to any other values) of the set $\{mag_0, mag_1, \ldots, mag_7\}$, then $$EAI = \frac{(mag_2 + mag_3)}{4}$$

This definition of EAI tends to make the edge strength yield the difference between tone values when the edge is formed using two distinct tone values. Thus the edge strength defined by the EAI is orientation independent.

MIX SUPPRESSION PARAMETER, $\eta$

The mix suppression parameter, $\eta$, is used in conjunction with the tone level of pixel being halftoned and the edge activity index to suppress the mixture of small dither matrix on the light side of an edge. The mix suppression parameter may also be used to preserve the sharpness of anti-aliased edges. The edge strength alone may yield undesirable perceptual artifacts along non anti-aliased edges that are transitions between two mid-tone levels. High edge strength will indicate less use of the large dither matrix in the final halftoned output. When transitioning from one mid-tone to another, partial suppression of the small dither matrix (i.e., non halftone) in the final halftone may be desirable. The small dither matrix tends to break up the periodicity of the large dither matrix, thus creating undesirable visual artifacts.

Figure 6:
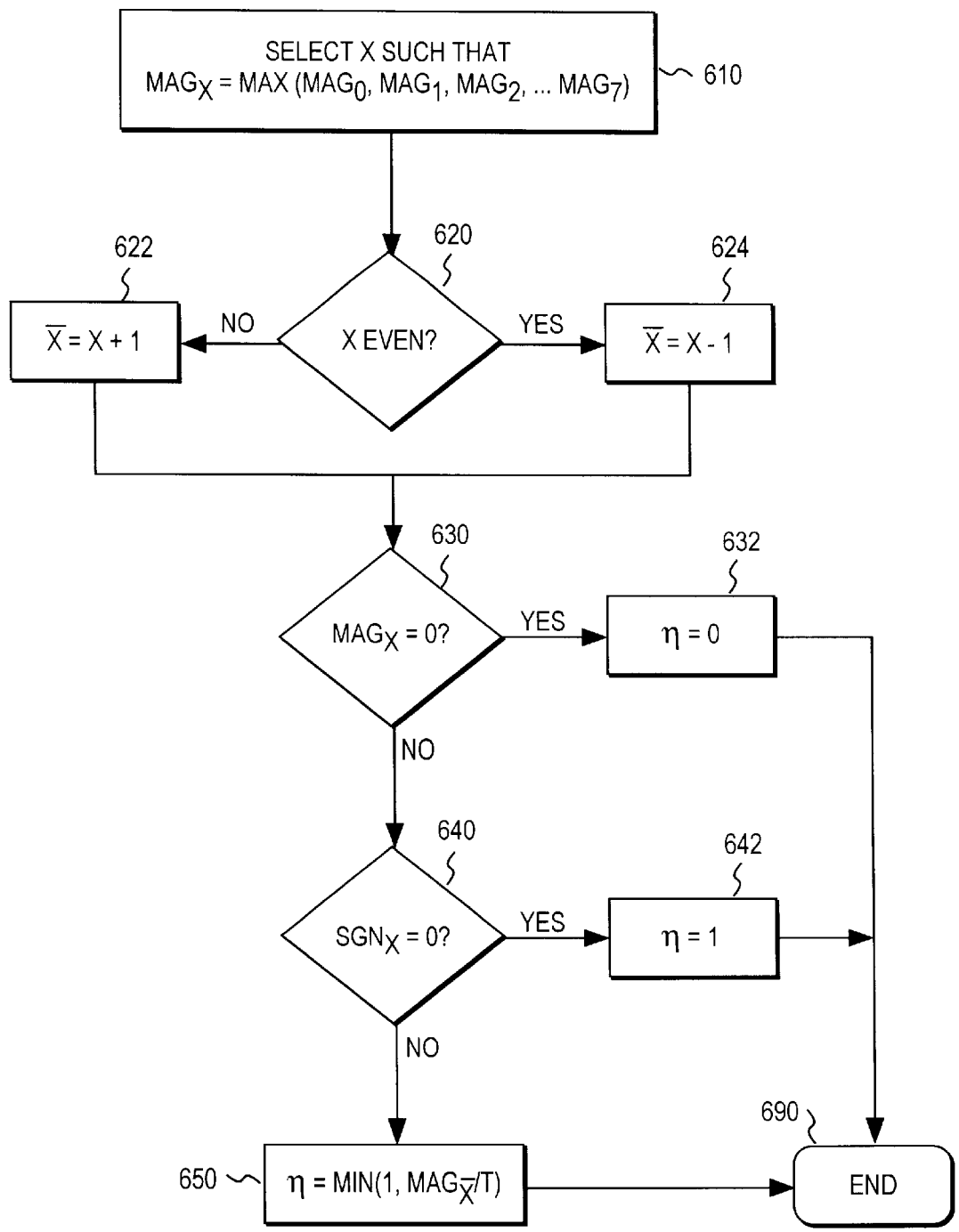
FIG. 6 illustrates one embodiment of a method for calculating a mix suppression parameter.

FIG. 6 illustrates one method of computing a mix suppression factor, $\eta$. In step 610, x is selected such that $mag_x = \max\{mag_0, mag_1, mag_2, \ldots mag_7\}$. Step 620 determines whether x is even. The value of another index variable, $\bar{x}$, is set to x+1 in step 622, if x is even. Otherwise $\bar{x}$ is set to x−1 in step 624. After either 622 or 624, step 630 tests to determine if $mag_{\bar{x}}=0$. If $mag_{\bar{x}}=0$ then $\eta$ is set to 0 as indicated by step 632 and the process is completed in step 690.

If $mag_{\bar{x}} \neq 0$, then step 640 determines whether $sign_{\bar{x}}=0$. If $sign_{\bar{x}}=0$, then step 642 sets $\eta=1$ and the process is completed in step 690. Otherwise, step 650 sets $$\eta = \min\left(\frac{mag_x}{T}, 1\right),$$

where T is a pre-determined value and "min" is the function that selects a value from its argument list that is less than or equal to any other value in its value list. In one embodiment T is approximately 25.

EDGE INDICATOR PARAMETER, EI

The edge indicator (EI) parameter is a flag. If any quantity in the set $\{mag_0, mag_1, mag_2, \ldots mag_7\}$ is nonzero, then the edge indicator is 1. Otherwise, the edge indicator is 0. The edge indicator is used for white gap reduction.

NEIGHBORHOOD DARKNESS PARAMETER, $\gamma$

The neighborhood darkness factor, $\gamma$, is used to perform variable darkening by widening the laser pulse width of the pixel if necessary to compensate for isolated dot gain. In a light region a pixel cannot "grow" or develop well by itself, thus the laser pulse width value of the pixel should be widened.

To calculate $\gamma$, first the neighbors of the middle pixel ($p_5$) are used to calculate a normalized average, $S_n$, as follows:

$$S_n = \frac{p_1 + p_2 + p_3 + p_4 + p_6 + p_7 + p_8 + p_9}{8 \cdot 255}$$

In one embodiment, $\gamma$ is a piecewise linear function of Sn defined as follows:

$$\gamma = gamma(Sn) \begin{cases} 1.0 + q & \text{if } S_n < r \\ 1.0 & \text{if } S_n > s \\ 1.0 + q \cdot (s - S_n)/(s - r) & \text{otherwise} \end{cases}$$

Figure 7:
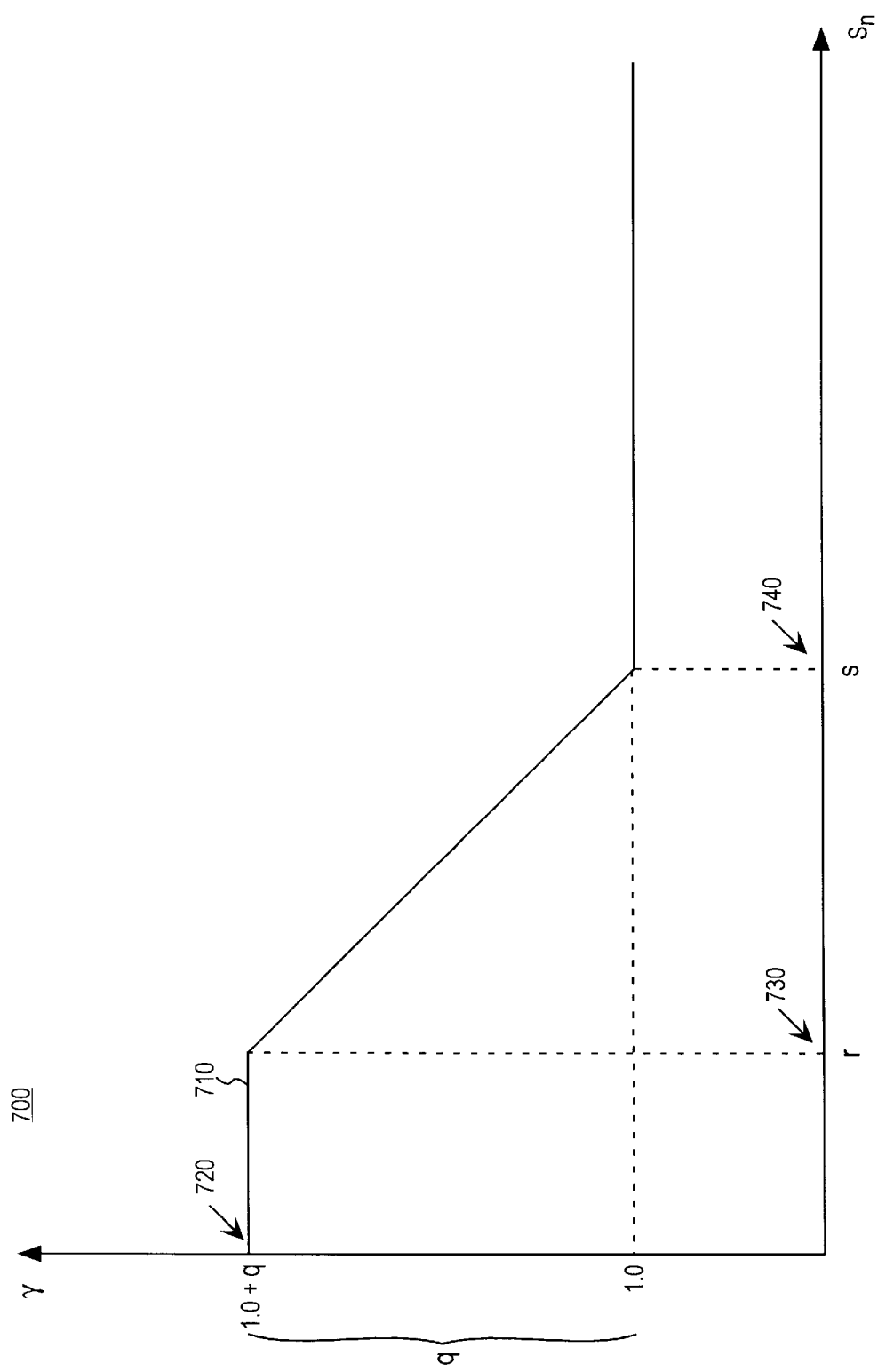
FIG. 7 illustrates one embodiment of a piecewise linear $\gamma$ as a function of Sn.

FIG. 7 illustrates the relationship between Sn and $\gamma$ in chart 700. In particular, $\gamma$(Sn) is piecewise linear as indicated by 710. A y-intercept 720 is at 1+q, where q is referred to as the "gamma added max." The x-axis coordinate for a first break point 730 is located at the "gamma cut point," r. The x-axis coordinate for a second break point 740 is located at the "gamma boost point," s.

Although the values of q, r, and s will vary from one printer to another value assignments such as q=3.5, r=0, and s=0.2–0.5 work for some models of laser printers.

VARIABLE DARKENING

The variable darkening block compensates for the isolated dot gain problem. If the small matrix dithered output signal, S, corresponds to a normalized pulse width between 0 and 1 where 0 is white or zero pulse width and 1 is full pulse width, then the darkened pulse width generated by the variable darkening block is calculated as follows:

$$V = \text{darkened output} = 1.0 - (1.0 - S)^{\gamma}$$

The variable darkening block has no effect if $\gamma=1$. Thus in one embodiment, variable darkening is suppressed by selecting $\gamma$ approximately equal to 1.0 (i.e., $\gamma \approx 1.0$)

MIXING

The mixing block 440 combines the results of the large dither matrix and the variable darkening block in accordance with the EAI, $\eta$, and the continuous tone value of the pixel being halftoned ($p_5$), to control the pulse width output of the rendering device.

A general function describing the halftone output of the mixing block may be expressed as follows:

mixing output=$f(L, V, EAI, p_5, \eta)$.

Assuming f is linear with respect to the large matrix dither output (L) and the variable darkening output (V), the mixing output may be expressed as follows:

mixing output=$L \cdot W_L + V \cdot W_V$, or mixing output=$L \cdot W_L + W_V \cdot (1.0 - (1.0 - S))^{\gamma}$ where $W_L$ and $W_V$ correspond to the weights to be accorded to the large dither matrix and the variable darkening output, respectively. Again, if $\gamma=1$, then there is no variable darkening and V=S such that the weighting factor $W_V$ is effectively a small dither matrix weighting factor $W_S$.

These weighting factors may themselves be expressed as arbitrary functions F1 and F2 as follows:

$W_L = F1(p_5, EAI, \eta)$ $W_V = F2(p_5, EAI, \eta)$

In one embodiment, F1 is a nonincreasing function of the EAI parameter and F2 is a nondecreasing function of the EAI parameter for a given $p_5$ and $\eta$. This ensures that greater weight is given to the small dither matrix in a region where EAI has a relatively high value. In one embodiment, the weighting factors are normalized to a constant total weight of 1.0 such that $W_L + W_V = F1(p_5, EAI, \eta) + F2(p_5, EAI, \eta) = 1.0$ For a given $p_5$ and $\eta$, F1 and F2 are defined using the values LOW_CUT and HIGH_CUT1 in one embodiment as follows:

$$F2(p5, EAI, \eta) = \begin{cases} 0, & EAI < \text{LOW\_CUT} \\ \eta \cdot \dfrac{EAI - \text{LOW\_CUT}}{\text{HIGH\_CUT2} - \text{LOW\_CUT}} & \text{LOW\_CUT} < EAI < \text{HIGH\_CUT2} \\ \eta, & \text{otherwise} \end{cases}$$

where HIGH_CUT2=MAX($p_5$, HIGH_CUT1), and

F1($p_5$, EAI, $\eta$)=1.0−F2($p_5$, EAI, $\eta$)

Figure 8:
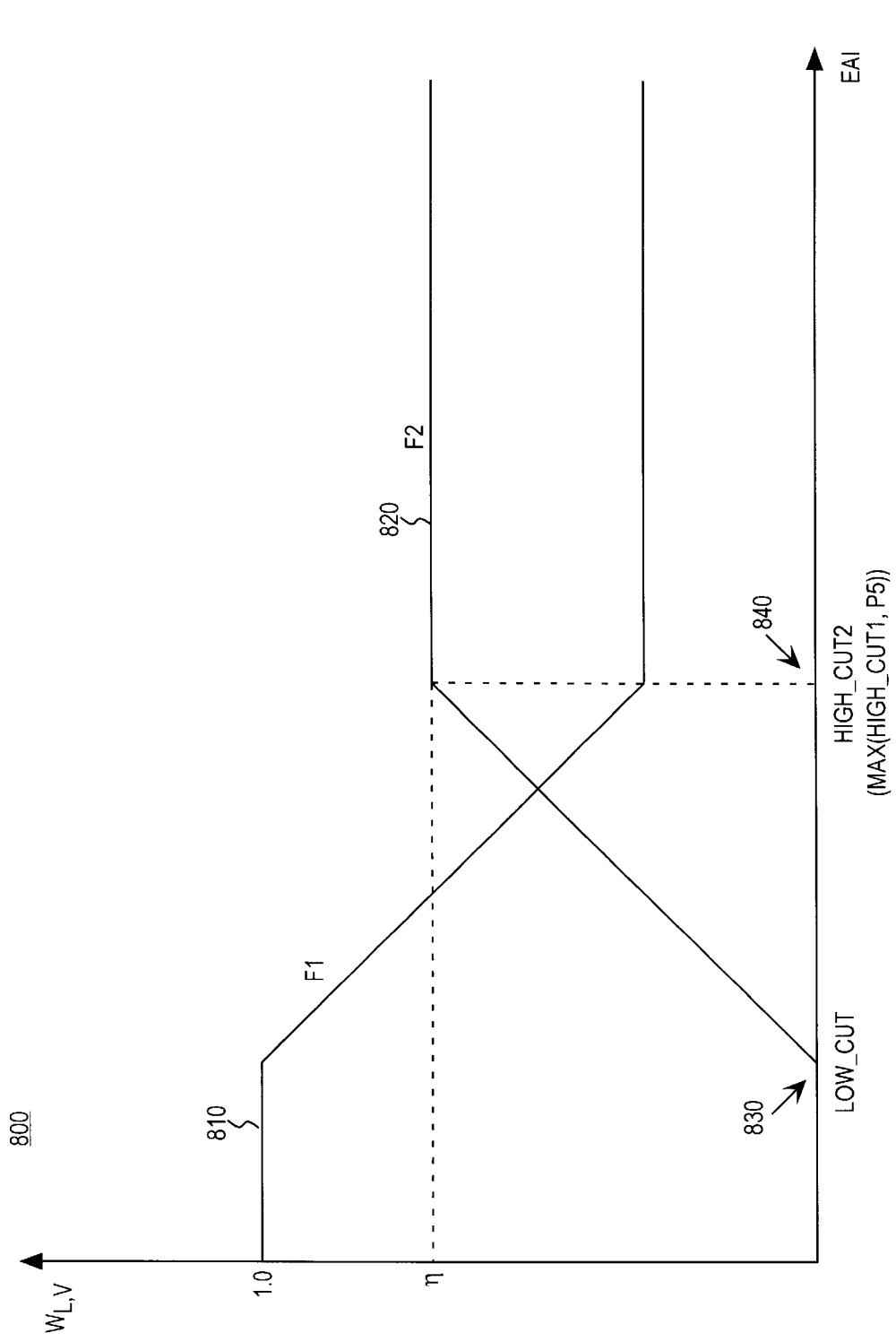
FIG. 8 illustrates one embodiment of piecewise linear F1 and F2 as functions of the edge activity indicator for combining the results of the large and small dither matrices.

This mixing function is illustrated by chart 800 of FIG. 8. In particular, F1 810 is complementary to F2 820. The LOW_CUT 830 and HIGH_CUT2 840 indicate the breakpoints in the piecewise linear weighting functions F1 and F2.

Although the values of LOW_CUT and HIGH_CUT that generate perceptually desirable results may vary from one printer to another, value assignments such as LOW_CUT=0 and HIGH_CUT=40–63 appear to work for some models of laser printers.

LARGE DITHER MATRIX

Referring to FIG. 4, the large dither matrix block 430 performs low spatial frequency halftoning. The large dither matrix is applied to the image and the values in the large dither matrix act as thresholds to halftone the image as is well known in the art. In one embodiment, the dither matrix is realized using a lookup table. The dithered or low spatial frequency screen output (L) corresponds to the pulse width value of the laser source. For 8 bit pixels and a dither matrix of order N, a two dimensional lookup table of size $2^8$ by N may be used. The halftoning process calculates the dither matrix cell number given the location of the pixel being halftoned as follows:

dither cell index=$f$(row, column, color_plane)

The halftone value is then looked up from the table using the dither cell index and the continuous tone value of the pixel as follows:

$L$=TABLE(dither cell index, continuous tone value)

FIG. 9 illustrates one embodiment of a two dimensional pulse width halftone lookup table 900 for the large dither matrix block 430. Rows (e.g., 910) represent different tone level values for the pixel (e.g., p5). Columns (e.g., 920) correspond to the different dither cell indices. The intersection of rows and columns are the pulse width entries (e.g., 930) for a particular continuous tone level and dither cell index. Thus "63" is the value indicated for a dither cell index of "3" and a tone level of "253." Thus L=63 in this example.

SMALL DITHER MATRIX

The small dither matrix block 420 is used to halftone the data in detailed areas, thus the dither matrix size should be smaller than the effective size of large dither matrix block 430. Otherwise, the small dither matrix block performs the same as the large dither matrix block 430.

The line frequencies for each of the small and large dither matrices may be chosen subject to the user's discretion. If the spatial frequencies are close to each other, however, a perceptually undesirable "stitching" effect can occur. Consider the example where the large dither matrix has a spatial frequency of 141 lpi (lines per inch) and the small dither matrix has a spatial frequency of 212 lpi. Each of these spatial frequencies are frequently used when halftoning at resolutions of 600 dpi (dots per inch). The result of combining these halftoning matrices, however, can yield 71 (i.e., 212−141) stitches per inch which may result in perceptually undesirable artifacts. If the large and small dither matrices are at different angles with respect to each other, another stitching effect can occur in the interaction between the dither matrix screens at different orientations and locations.

In one embodiment, the small dither matrix is selected to have a spatial frequency that is an odd spatial harmonic of the larger dither matrix. Thus, for example, if the large dither matrix is designed for 100 lpi at 0°, the small dither matrix is selected to be an odd multiple such as 300 lpi at 0°. This approach enables a greater number of halftone dots in the detailed regions without the stitching effect.

In another embodiment, the small dither matrix is a 1×1 matrix. This selection for the small dither matrix results in no halftoning. The continuous tone image input indexes directly into the pulse width output. This choice of N for the small dither matrix ensures that stitches will not occur independent of the spatial frequency of the large dither matrix.

Another consideration for the interaction between the small and large dither matrices is the matching and linearization of tone. The two dither matrices can be calibrated to have the same average tonal response when the input image as the same continuous tone level in a large area.

WHITE GAP REDUCTION

Edge dot growth compensation or white gap reduction may be desirable for some print engines. The white gap problem typically occurs along an edge between a darker tone region and an almost white region. Toner deposition characteristics can cause the dark side of the edge to recede while the light side fails to fully deposit. This artifact can be eliminated or reduced by depositing extra toner on the light side of the edge.

Figure 10:
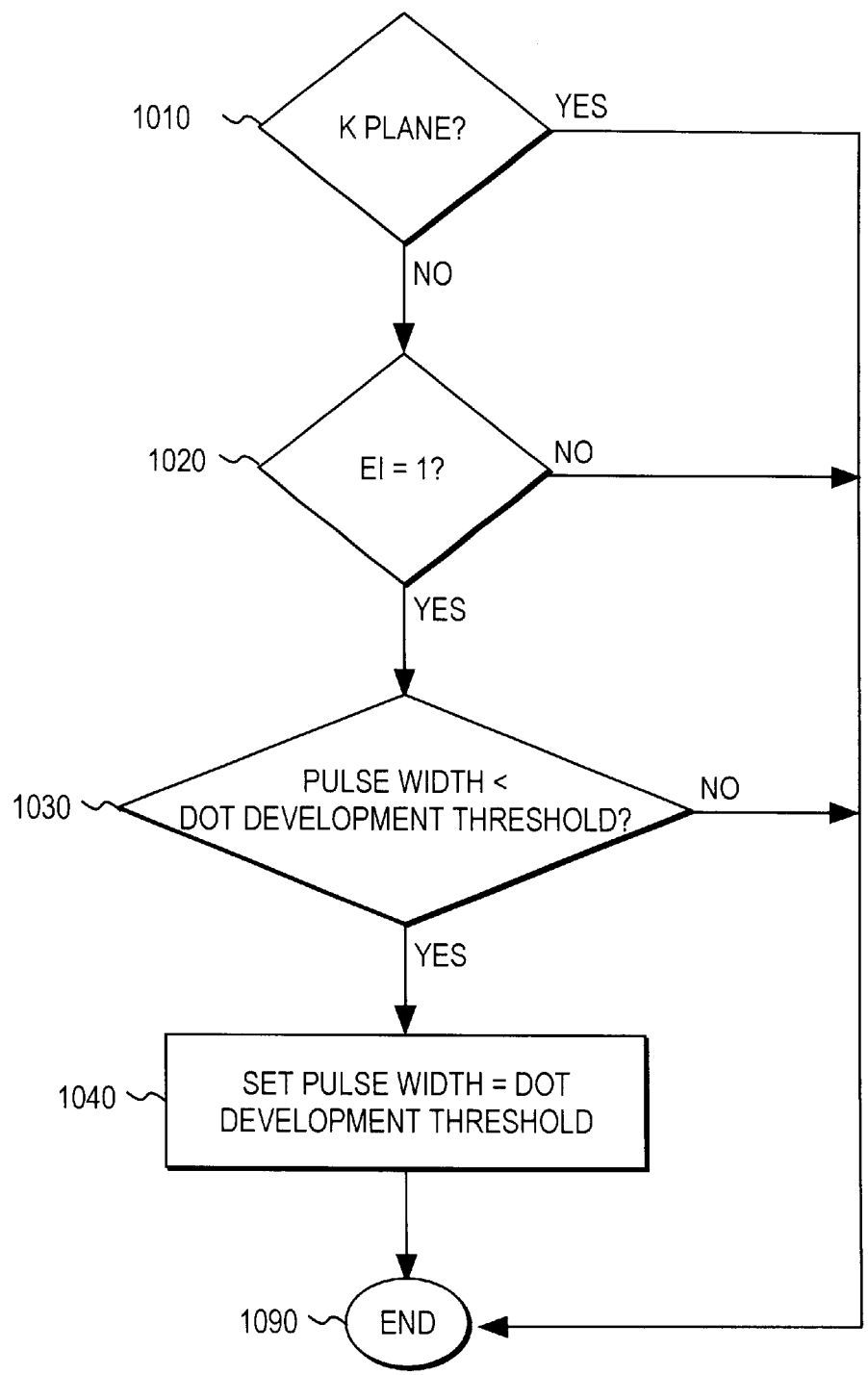
FIG. 10 illustrates a method of post-processing the halftone value to accommodate edge dot growth for white gap reduction.

FIG. 10 illustrates the method used for white gap reduction. If the plane being processed is the K plane of the CMYK color space as determined in step 1010, the process stops with no white gap reduction in step 1090. Otherwise, the edge indicator, EI is tested in step 1020. If EI is not 1.0, then the process stops with no white gap reduction in step 1090. Otherwise, the pulse width output is compared with a pre-determined dot development threshold in step 1030. If the pulse with is greater than or equal to the threshold, then the process stops with no change in the pulse width in step 1090. Otherwise, the pulse width is set to the dot development threshold in step 1040 before the process is finished in step 1090.

Obviously, the pulse width is unchanged unless all three conditions are met. Edge dot growth compensation can be avoided by setting the dot development threshold, for example, to 0.

The dot development threshold should be selected so that the toner starts to get deposited in an area when the area is relatively large and the pulse width is a small amount above the dot development threshold. Thus when the pulse width is set at the dot development threshold in a white region, there is no toner deposition. This size of pulse width will also aid any receding edge problems.

The adaptive halftoning process illustrated in FIG. 3 is particularly suited for printing images with fine lines and vectors such as those generated by computer aided design (CAD) applications. The adaptive halftoning process can also be used to smooth out the jaggedness of the edges between a near saturation level and a white background. Such edges may otherwise appear jagged as a result of the large dither matrix's angle. In the absence of any other smoothing functions, the large dither matrix also tends to generate jagged edges at anti-aliased boundaries. The process of FIG. 3 tends to eliminate jaggedness resulting from halftoning anti-aliased edges with the large dither matrix.

The halftoning process of FIG. 3 allows preserving greater detail in the high activity areas through the use of the small dither matrix while maintaining the smooth stable fills that are a result of the large dither matrix because of the ability to adapt between vary levels of activity through the weighting process. The EAI and η parameters are used to control the weighting function. The γ parameter permits gain compensation for dot growth. The edge indicator parameter is used to reduce white gaps in the final halftoned image. The process of FIG. 3 enables printing of fine lines and vectors of different colors (for color laser printers) and different gray level printing (for monochrome printers).

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) thresholding a selected pixel of a source image to generate a first dithered output signal, L;
   b) thresholding the selected pixel to generate a second dithered output signal, S; and
   c) generating a weighted combination of the first and second dithered output signals in accordance with at least one of an edge activity indicator parameter and a mix suppression parameter calculated from pixel values within a region of the source image containing the selected pixel.

2. The method of claim 1 wherein step c) further comprises the steps of:
   i) generating a darkening output V as a function of S in accordance with a darkening parameter, γ;
   ii) weighting the first dithered output signal, L, with a weight $W_L$.
   iii) weighting the darkening output V with a weight $W_V$.
   iv) calculating the weighted combination as $W_L \cdot L + W_V \cdot V$.

3. The method of claim 2 wherein γ is selected such that V≈S.

4. The method of claim 2 wherein $W_L + W_V \approx 1.0$.

5. The method of claim 2 wherein the weighting factor $W_V$ is a function of the selected pixel tone value, the edge activity indicator, and η, wherein $0 \leq W_V \leq 1.0$.

6. The method of claim 5 wherein the function for computing the weighting factor $W_V$ is a piecewise linear function having an x-axis intercept at LOW_CUT, wherein HIGH_CUT1 is a pre-determined breakpoint of the piecewise linear function, wherein HIGH_CUT2=MAX(selected pixel tone value, HIGH_CUT1) and $$W_V = \begin{cases} 0, & EAI < \text{LOW\_CUT} \\ \eta \cdot \frac{EAI - \text{LOW\_CUT}}{\text{HIGH\_CUT2} - \text{LOW\_CUT}} & \text{LOW\_CUT} < EAI < \text{HIGH\_CUT2} \\ \eta, & \text{otherwise} \end{cases}$$

7. The method of claim 2 wherein S is normalized to [0, 1], wherein V is calculated as $V=1.0-(1.0-S)^\gamma$.

8. The method of claim 2 wherein the darkening parameter, γ, is a piecewise linear function of a normalized sum of neighbors ($S_n$) of the selected pixel, a gamma_added_max constant (q), a gamma_cut_point constant (r), and a gamma_boost_point constant (s), wherein γ=

$$\gamma = \begin{cases} 1.0 + q & \text{if } S_n < r \\ 1.0 & \text{if } S_n > s \\ 1.0 + q \cdot (s - S_n)/(s - r) & \text{otherwise} \end{cases}$$

9. The method of claim 1 further comprising the steps:
   d) boosting the value of the combined dithered output signals to accommodate white gap reduction, wherein the combined dithered output signal is set equal to a pre-determined dot development threshold if the color plane being processed is not the black (K) color plane and if an edge indicator parameter (EI) indicates that an edge is present in the selected region, and if the combined dithered output signal is otherwise less than the dot development threshold.

10. The method of claim 1 wherein a threshold array having a first spatial frequency is used to generate the first dithered output signal, wherein a threshold array having a second spatial frequency is used to generate the second dithered output signal, wherein the second spatial frequency is an odd harmonic of the first spatial frequency.

11. The method of claim 1 wherein a threshold array of order N is used to generate the first dithered output signal, wherein a threshold array of order 1 is used to generate the second dithered output signal, wherein N≠1.

12. An apparatus comprising:
   a) a first dithering block thresholding a selected pixel of a source image to generate a first dithered output signal, L;
   b) a second dithering block thresholding the selected pixel to generate a second dithered output signal, S; and
   c) a mixing block generating a weighted combination of the first and second dithered output signals in accordance with at least one of an edge activity indicator parameter and a mix suppression parameter, wherein the parameters are calculated from pixel values within a region of the source image including the selected pixel.

13. The apparatus of claim 12 further comprising:
   d) a variable darkening block boosting S to V in accordance with a darkening parameter, γ, wherein the mixing block weights the first dithered output signal with a weight $W_L$, wherein the mixing block weights the second dithered output signal with a weight $W_V$, wherein the mixing block calculates the weighted combination as $W_L \cdot L + W_V \cdot V$.

14. The apparatus of claim 13 wherein γ is selected such that V≈S.

15. The apparatus of claim 13 wherein $W_L + W_V \approx 1.0$.

16. The apparatus of claim 13 wherein the weighting factor $W_V$ is a function of the selected pixel tone value, the edge activity indicator, and η, wherein $0 \leq W_V \leq 1.0$.

17. The apparatus of claim 16 wherein the function for computing the weighting factor $W_V$ is a piecewise linear function having an x-axis intercept at LOW_CUT, wherein HIGH_CUT1 is a pre-determined breakpoint of the piecewise linear function, wherein HIGH_CUT2=MAX(selected pixel tone value, HIGH_CUT1) and $$W_V = \begin{cases} 0, & EAI < \text{LOW\_CUT} \\ \eta \cdot \dfrac{EAI - \text{LOW\_CUT}}{\text{HIGH\_CUT2} - \text{LOW\_CUT}} & \text{LOW\_CUT} < EAI < \text{HIGH\_CUT2}. \\ \eta, & \text{otherwise} \end{cases}$$

18. The apparatus of claim 13 wherein S is normalized to [0, 1], wherein V is calculated as $V=1.0-(1.0-S)^\gamma$.

19. The apparatus of claim 13 wherein the darkening parameter, $\gamma$, is a piecewise linear function of a normalized sum of neighbors ($S_n$) of the selected pixel, a gamma_added_max constant (q), a gamma_cut_point constant (r), and a gamma_boost$_{13}$ point constant (s), wherein $\gamma=$ $$\gamma = \begin{cases} 1.0 + q & \text{if } S_n < r \\ 1.0 & \text{if } S_n > s \;. \\ 1.0 + q \cdot (s - S_n)/(s - r) & \text{otherwise} \end{cases}$$

20. The apparatus of claim 12 further comprising:
d) a white gap reduction block, wherein the white gap reduction block boosts the value of the combined dithered output signal to accommodate white gap reduction, wherein when the color plane being processed is not the black (K) color plane and the combined dithered output signal is less than a pre-determined dot development threshold and an edge indicator parameter (EI) indicates that an edge is present in the region, then the combined dithered output signal is set equal to the pre-determined dot development threshold.

* * * * *